United States Patent
Vetter

[19]

[11] Patent Number: 5,857,727
[45] Date of Patent: Jan. 12, 1999

[54] RETRACTABLE WINDSHIELD AND FLARE PANEL ASSEMBLY

[76] Inventor: Craig W. Vetter, 28100 Schulte Rd., Carmel, Calif. 93922

[21] Appl. No.: 842,963

[22] Filed: Apr. 25, 1997

[51] Int. Cl.[6] ..................................................... B62J 17/00
[52] U.S. Cl. ........................... 296/78.1; 296/84.1; 296/89
[58] Field of Search ........................ 296/89, 84.1, 78.1, 296/96.11; 280/304.3

[56] References Cited

U.S. PATENT DOCUMENTS

| | | | |
|---|---|---|---|
| 1,616,619 | 2/1927 | Hasselkus | 296/89 |
| 4,166,650 | 9/1979 | Saunders, IV | 296/78.1 |
| 4,168,098 | 9/1979 | Willey | 296/78.1 |
| 4,353,590 | 10/1982 | Wei-Chuan | 296/78.1 |
| 4,355,838 | 10/1982 | Hickman | 296/78.1 |
| 4,379,584 | 4/1983 | Willey | 296/78.1 |
| 4,465,315 | 8/1984 | Barstow | 296/78.1 |
| 4,489,973 | 12/1984 | Willey | 296/78.1 |
| 4,536,005 | 8/1985 | Tanaka et al. | 280/289 |
| 4,615,556 | 10/1986 | Stahel | 296/78.1 |
| 4,686,656 | 8/1987 | Morishima | 296/78.1 X |
| 4,696,509 | 9/1987 | Yagasaki et al. | 296/84 |
| 4,707,017 | 11/1987 | Minobe et al. | 296/78.1 |
| 4,830,423 | 5/1989 | Nebu et al. | 296/78.1 |
| 4,840,418 | 6/1989 | Bockenhauser | 296/91 |

*Primary Examiner*—D. Glenn Dayoan
*Assistant Examiner*—Jason Morrow
*Attorney, Agent, or Firm*—Patrick T. King

[57] ABSTRACT

A retractable windshield and flare panel assembly for a motorcycle includes a vertically moveable windshield and a pair of oppositely-moving, horizontally-retractable flare panels. A motor-driven drive screw drives a vertically moving threaded drive block. The drive block engages the windshield to move the windshield vertically. A pair of flare panel sliders are also mounted to the drive block and engage elongated slots in the flare panels. The elongated slots extend in both horizontal and vertical directions so that the flare panel sliders function as cams to move the flare panels horizontally. The drive screw is turned by a reversible motor to move the threaded drive block up and down. This vertically positions the windshield and by cam action horizontally positions the flare panel slides on each side of the windshield module. The curved movable windshield and the left and right flaring panels are arranged to slide past each other within a structurally strong module formed as a sandwich having front and rear windshield support panels and a flare support panel with the windshield and flare panels slideably mounted thereto.

13 Claims, 7 Drawing Sheets

RETRACTABLE WINDSHIELD AND FLARE PANEL ASSEMBLY

BACKGROUND OF THE INVENTION

1. Field of the Invention

This invention relates generally to windshields and fairings for motorcycles and the like and, more particularly, to a retractable windshield and flare panel assembly for motorcycles and the like.

2. Prior Art

A windshield for a motorcycle is mounted in front of a rider. Typically, a windshield for a motorcycle is provided as a separate unit which is bolted to the motorcycle. For high-speed road driving, the windshield provides some streamlining for the motorcycle as well as protection for the rider from wind, weather, and debris on the road such as dust and rocks. For low-speed, driving around town, the windshield is often unbolted and removed from the motorcycle. Removing and reattaching the windshield is time-consuming and inconvenient, particularly when the rider is on a road trip and storage of the windshield is inconvenient.

Windshields which are adjustable in height are sometimes incorporated into a fixed fairing assembly which is mounted in front of a rider to provide reduced drag for the motorcycle and protection for the rider against wind and weather. Windshields which are manually adjustable in height are available, but these require that the motorcycle be stopped for adjustment.

The need has arisen for an improved retractable motorcycle windshield and a retractable fairing assembly.

SUMMARY OF THE INVENTION

It is therefore an object of the invention to provide an improved retractable motorcycle windshield and retractable fairing assembly.

In accordance with this and other objects of the invention, a retractable windshield and flare panel assembly module for a motorcycle is provided. Tracks engage and guide the side edges of a vertically moveable windshield as the windshield edges moves vertically up and down. One preferred mechanism for moving the windshield vertically up and down includes a drive screw mechanism. A hole formed in the windshield is engaged by a windshield retainer which is mounted to a threaded drive block. The threaded drive block engages a drive screw, which is turned, for example, by an electric motor, to move the threaded drive block and vertically position the windshield.

The retractable windshield and flare panel assembly also includes a pair of oppositely-moving, horizontally-retractable flare panels. Flare panel tracks engage and guide the top and bottom edges of each of the pair of horizontally retractable flare panels as the pair of horizontally retractable flare panels move horizontally.

The flare panels are moved horizontally utilizing elongated slots formed in the left and right flare panels. which extend in both vertical and horizontal directions, in the movable . These slots are engaged by panel sliders which are also mounted to the threaded drive block. When the sliders are moved vertically by the drive screw, the sliders operate as cams to move the retractable flare panels horizontally.

Both the windshield and the flare panels are simultaneously positioned by the drive screw so that, when the windshield is moved vertically by the drive screw, the oppositely-moving, horizontally-retractable flare panels also move horizontally.

A specific preferred embodiment of a retractable windshield and retractable windshield and flare panel assembly for a motorcycle according to the invention includes a vertically moveable windshield which has side edges. A front windshield support panel is fixed to one side of a rear windshield support panel. Windshield tracks are fixed between the front and rear windshield support panels to engage and guide the side edges of the windshield as the windshield edges slide vertically in the windshield tracks between the front windshield support panel and the rear windshield support panel. A rear flare-panel support panel is fixed to the other side of the rear windshield support panel.

A movable left flare panel has top and bottom edges. Left flare panel tracks are fixed between the fixed rear windshield panel and the fixed flaring rear panel. The tracks engage and guide the edges of the left flare panel as the left flare panel slides horizontally in the left flare panel tracks.. Similarly a movable right flare panel has top and bottom edges and right flare panel tracks which are fixed between the fixed rear windshield panel and the rear flaring-panel support panel for engaging and guiding the edges of the right flare panel as the right flare panel slides horizontally in the tracks.

The movable windshield, left and right flaring panels, all of the tracks, the fixed front windshield panel, the fixed rear windshield panel, the fixed flaring rear panel are all curved. The curved movable windshield, left and right flaring panels, all of the tracks, the fixed front windshield panel, the fixed rear windshield panel, the fixed flaring rear panel are all arranged to slide past each other. For structural strength the concentric panels of the windshield, the left and right flaring panels, all of the tracks, the fixed front windshield panel, the fixed rear windshield panel, and the fixed flaring rear panel are all curved and concentrically arranged in a sandwich configuration to provide a structural bridge arc. The windshield is curved and held in a curved position for improved structural support and also to provide improved resistance to wind-induced deformation of the windshield. Additional vertical support is provided by vertically extending angle brackets fixed to the rear of the module.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
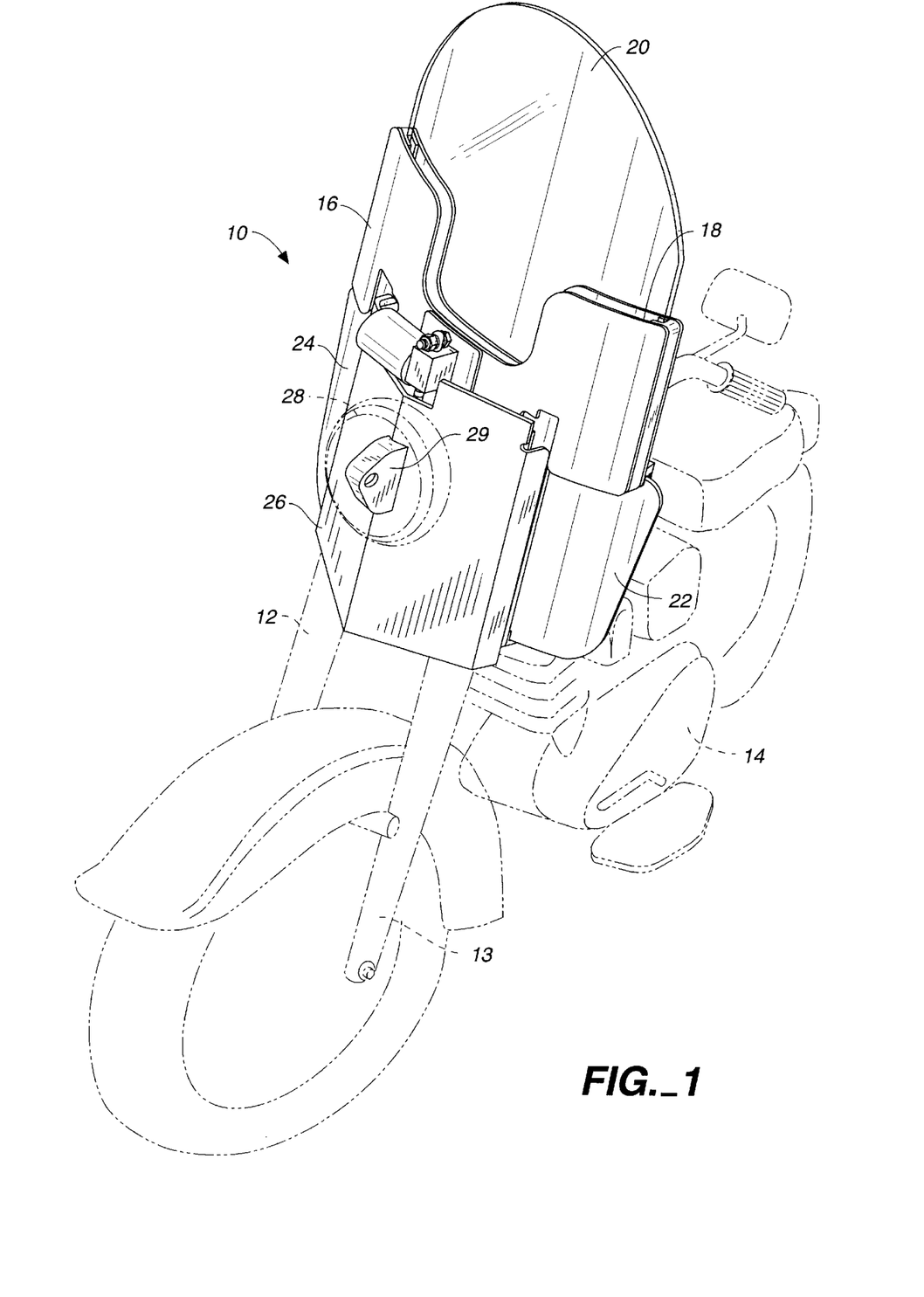
FIG. 1 is a perspective view of a motorcycle having a retractable windshield and flare panel assembly mounted to the fork thereof where the retractable windshield and flare panel assembly is shown in a retracted configuration with the windshield retracted down and with the flare panels retracted.

FIG. 1 shows a retractable windshield and flare panel assembly 10 according to the invention mounted to the front forks 12, 13 of a representative typical motorcycle 14, shown in phantom. While the invention is described herein below in connection with a motorcycle, it is intended that the invention is also applicable to other vehicles, such as, for example, all-terrain vehicles, snowmobiles, and the like, which can also be appropriately mounted with a retractable windshield and flare panel assembly 10 according to the invention.

The retractable windshield and flare panel assembly 10 includes a front windshield support panel 16 and a rear windshield support panel 18 between which is slideably mounted a vertically moveable retractable curved windshield 20. The retractable curved windshield 20 is shown in its extended position in the assembly 10.

The rear windshield support panel 18 also has slideably mounted thereto a horizontally retractable left flare panel 22 and a horizontally retractable left flare panel 24. The horizontally retractable left flare panel 20 and the retractable left flare panel 20 are also shown in their respective horizontally extended positions. A headlight panel 26 is permanently fixed to the front windshield support panel 16 for mounting a headlight 28 on a headlight mounting bracket 29.

Figure 2:
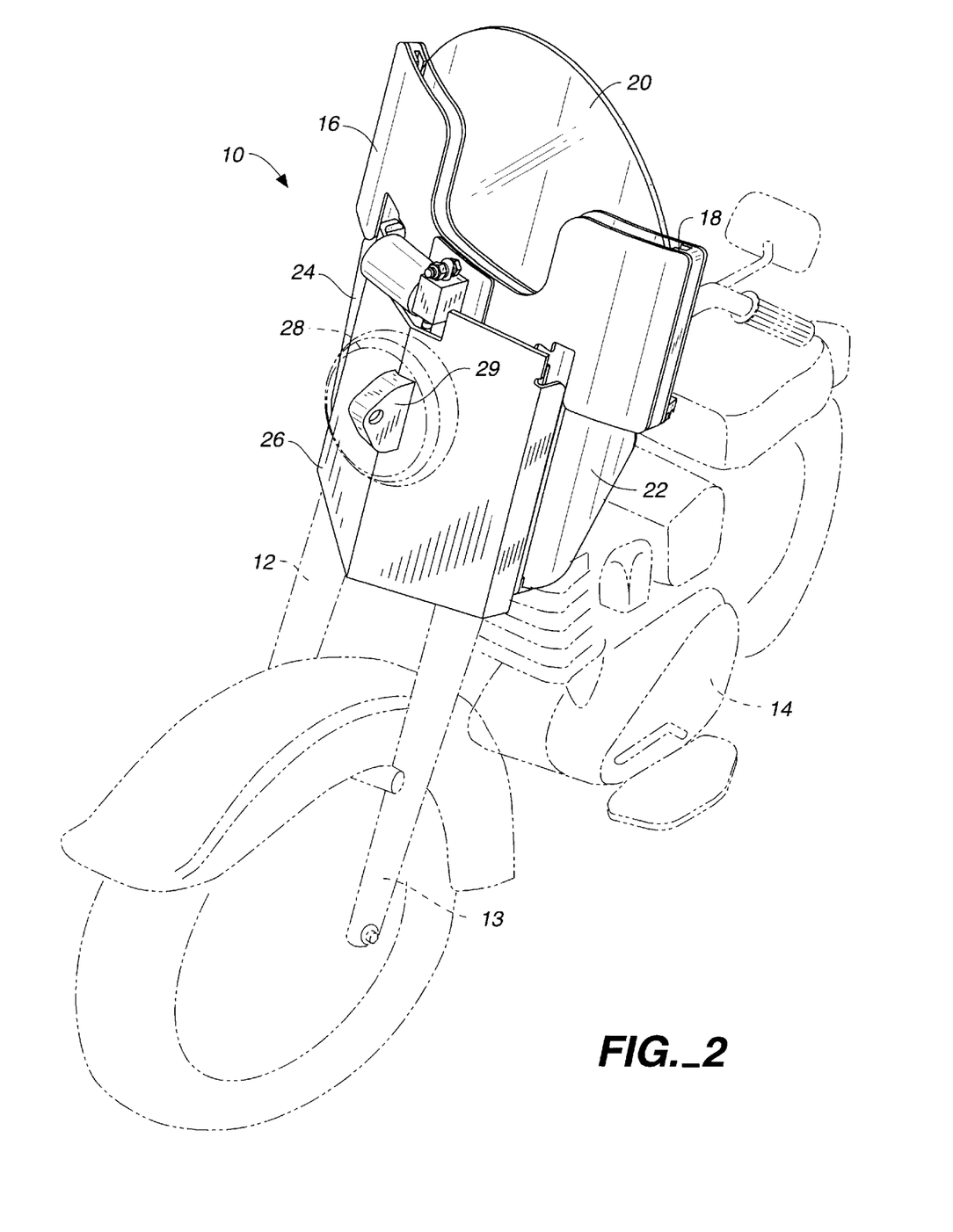
FIG. 2 is a perspective view of the motorcycle with the retractable windshield and flare panel assembly mounted to the fork thereof where the retractable windshield and flare panel assembly is shown in an extended configuration with the windshield extended up and with the flare panels extended sideward.

FIG. 2 shows the retractable windshield and flare panel assembly 10 with the vertically retractable curved windshield 20 in its vertically retracted position in the assembly 10. FIG. 2 also shows the horizontally retractable left flare panel 22 and the horizontally retractable left flare panel 24 in their respective horizontally retracted positions.

Figure 3:
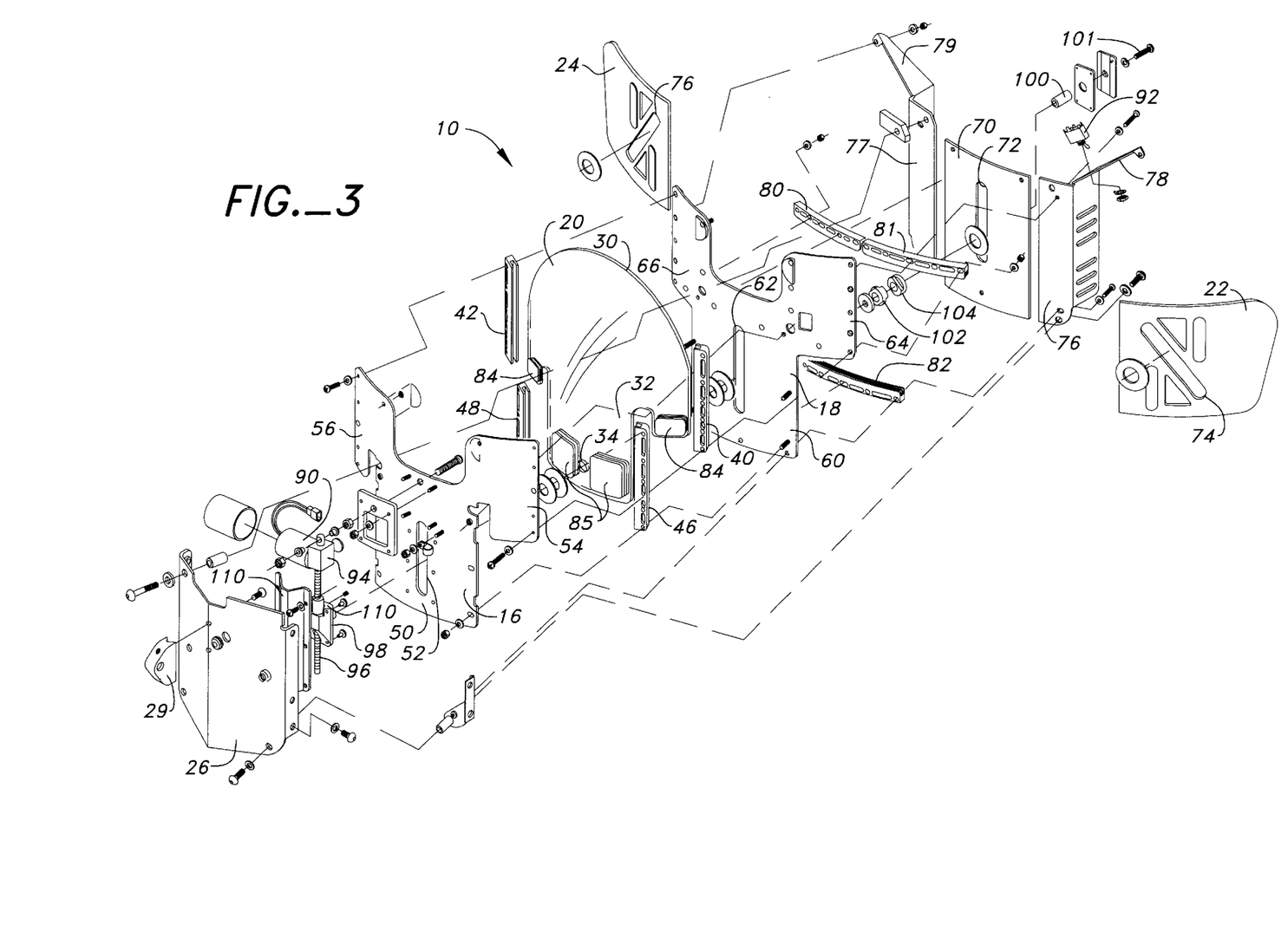
FIG. 3 is an exploded, perspective view showing the components of a retractable windshield and flare panel assembly.

FIG. 3 illustrates in an exploded view the various components and their assembly for one embodiment of a retractable windshield and flare panel assembly 10 according to the invention.

The vertically moveable windshield 20 is a curved, mushroom-shaped Lucite panel with a rounded top portion 30 and a rectangular lower portion 32. The windshield 20 is cylindrically curved around a vertical axis with an outside radius of approximately 27 inches. A hole 34 used for vertically moving the windshield is formed along the midline of the rectangular lower portion 32 near it bottom edge.

The curved windshield 20 is movably sandwiched for vertical up-and-down movement between a curved front windshield support panel 20 and a curved rear windshield support panel 22.

The side edges of the rounded top portion 30 of the curved windshield 20 are flat to engages respective corresponding guide grooves formed in a pair of vertically extending upper windshield guides 40, 42 which are respectively fixed between the side peripheral regions of the front windshield support panel 16 and the rear windshield support panel 18. The side edges of the rectangular lower portion 32 of the windshield 20 similarly engage respective corresponding guide groves formed in a pair of vertically extending lower windshield guides 46, 48. The upper windshield guides 40, 42 and the lower windshield guides 46, 48 are fixed near the outer edges of the front and rear windshield support panels 16, 44 with, for example, lock nuts and screws which extend through holes formed through the front windshield support panel 16, the rear windshield support panel 18, and the guides 40, 42, 46, 48. The guides 40, 42, 46, 48 are elongated strips of plastic material, each of which have a single longitudinal track, or groove, formed therein for engaging and guiding the respective side edges of the windshield 18 as those respective side edges slide vertically up and down in the guides.

The front windshield support panel 16 has a lower rectangular portion 50 with an elongated vertical slot 52 formed along its vertical centerline. A pair of generally rectangular wings 54, 56 extend away from the upper corners of the lower rectangular portion 50. The front windshield support panel 20 is cylindrically curved around a vertical axis with an inside radius of approximately 27 inches.

The rear windshield support panel 22 has a lower rectangular portion 60 also with an elongated vertical slot 62 formed along its vertical centerline. A pair of generally rectangular wings 64, 66 also extend away from the upper corners of the lower rectangular portion 62, corresponding to the wings of 54, 56 of the front panel 16. The rear windshield support panel 22 is cylindrically curved around a vertical axis with an outside radius of approximately 27 inches.

A curved rear flare-panel support panel 70 is fixed to the rear side of the rear windshield support panel 22. The rear flare-panel support panel 70 is generally rectangular also with an elongated vertical slot 72 formed along its vertical centerline.

The left flare panel 22 and the right flare panel 22 are sandwiched for movement between the rear windshield support panel 60 and the rear flare-panel support panel 70. The left flare panel 22 is a curved generally rectangular panel with a radius of approximately 26 inches and with an elongated slot 74 formed therein at a sixty degree angle with respect to horizontal. The right flare panel 24 is also a curved generally rectangular panel also with an inside radius of approximately 27 inches and also with an elongated slot 74 formed therein at a sixty degree angle with respect to horizontal.

A pair of vertically extending stainless steel mounting angle brackets 76, 77 are fastened near the respective side edges of the flare-panel support panel 70. Ears 78, 79 extend from the top edges of the mounting angle brackets and are fixed to the respective top outside corners of the rear windshield support panel 18.

A pair of horizontally extending upper flare panel guides 80, 81 are fixed between the upper peripheral regions of the rear flare-panel support panel 70, the angle brackets 76, 77, and the upper peripheral regions of the rectangular wings 64, 66 of the rear windshield support panel 60 using, for example, lock nuts and screws which extend through respective holes formed through the rear windshield support panel 60, the flare-panel support panel 70, and the guides 80 , 81. A horizontally extending lower flare panel guide 82 is similarly fixed between the lower peripheral regions of the rear flare-panel support panel 70 and the lower peripheral regions of the lower rectangular portion 60 of the rear windshield support panel 18 also using, for example, lock nuts and screws which extend through corresponding holes formed through the rear windshield support panel 18, the flare-panel support panel 70, and the guides.

The guides 80, 81, 82 are elongated strips of synthetic material which have two parallel lateral tracks, or grooves, formed therein for engaging and guiding the respective top and bottom edges of the left and right flare panels as they slide horizontally past each other in the tracks.

A motor-driven drive-screw and drive-block mechanism is provided for simultaneously moving the windshield 20 vertically and the flare panels 22, 24 horizontally. This mechanism includes a DC drive motor 90 which is controlled by a reversing switch 92 mounted to the ear 78. The drive motor 90 reversibly operates a screw drive mechanism 94. The screw drive mechanism 94 drives an externally threaded drive screw 96. An internally threaded drive block, or traveler, 98 engages the drive screw 96 and the drive screw 96 is reversibly turned to vertically position the drive block 98.

An internally threaded stud 99 extends from the drive block 98. A cylindrical post 100 is fixed to the projecting stud 99 with a ¼-20 screw 101. The stud 99 extends backward from the drive block 98 and through the slot 52 in the front windshield support panel 16 to engage the hole 34 formed in the lower portion of the windshield 20. The cylindrical post 100 further extends through the slot 82 in the rear windshield support panel 18 and through a pair of flare panel sliders 102, 104. The flare panel sliders 102, 104 are generally cylindrical parts with opposing flats formed thereupon for engagement with the long sides of the respective angled slots 74, 76 formed in the left and right flare panels 22, 24. Appropriate washers provide for spacing between the various components connected to the cylindrical post 100. A cover 110 for the drive screw 96 is attached to the front of the front windshield support panel 16.

As the drive screw 96 is turned by the motor 90 the drive block 98 is vertically moved to vertically position the windshield 20 in its guide tracks 40, 42, 46, 48.

As the drive screw 96 is turned, the flare panel sliders 102, 104 can move only vertically. The flare panel sliders 102, 104 engage in their respective elongated slots 74, 76, which are formed at an angle of sixty degrees with respect to horizontal. Vertical movement of the drive block 98 forces the flare panels by cam action to move horizontally. The horizontal positions of the flare panels are thereby controlled by the vertical position of the drive block 98 mounted on the drive screw 96.

As illustrated in FIG. 3, the windshield 20 has one set of four anti-rattle pads, typically illustrated as 84, attached to respective front and back lower surfaces of the top portion 30 of the windshield 20. Another set of four anti-rattle pads, typically illustrated as 85, are attached to respective front and back lower surfaces of the bottom portion 32 of the windshield 20.

The motor 90 is reversibly operated by a rider using the reversible switch 92 to simultaneously vertically position the windshield 14 and horizontally position the flare panels 22, 24 on each side of the windshield module 10.

Figure 4:
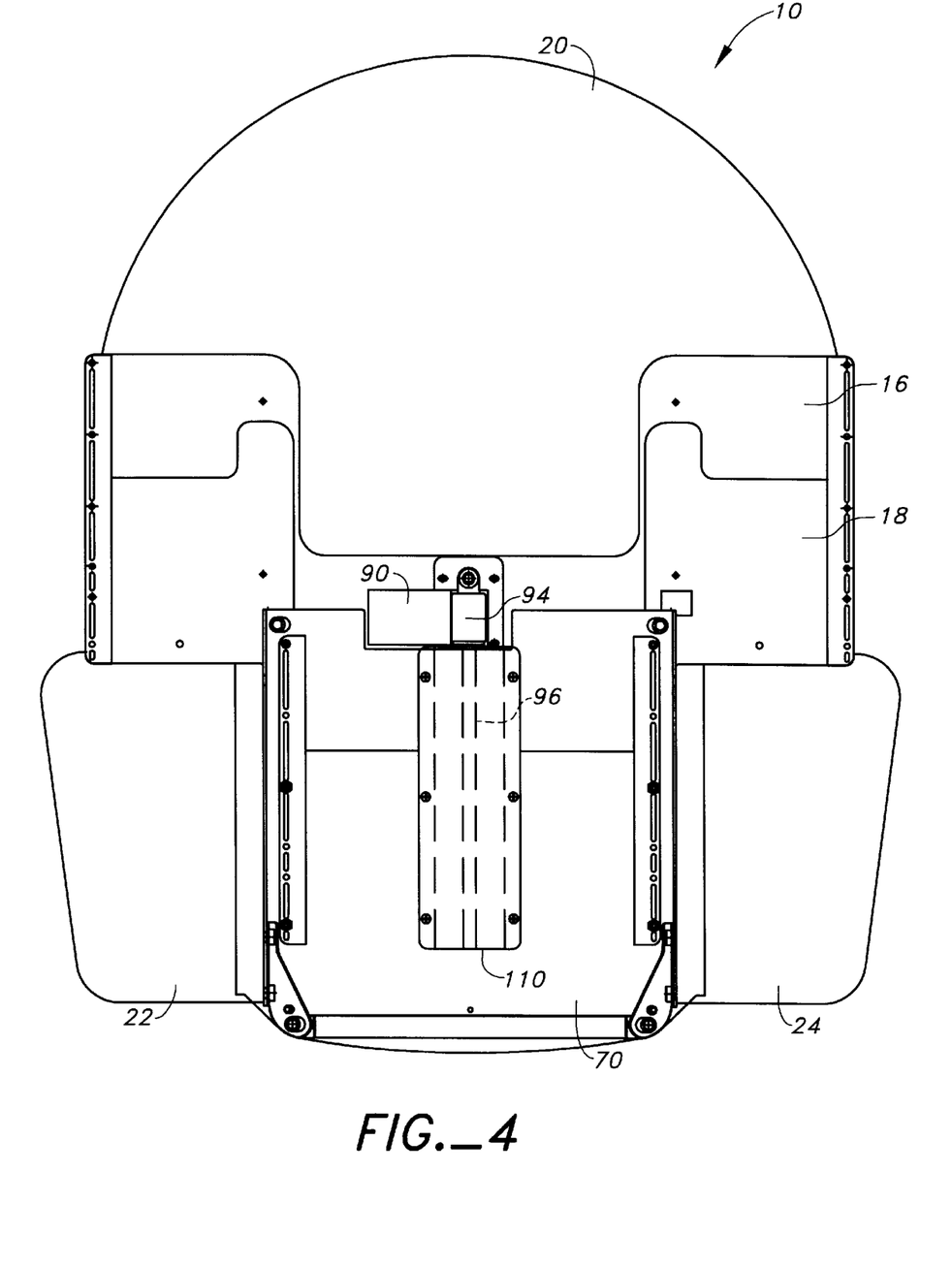
FIG. 4 is a front elevational view of an assembled retractable windshield and flare panel assembly in an extended configuration having the windshield extended up and the flare panels extended sideward.
Figure 5:
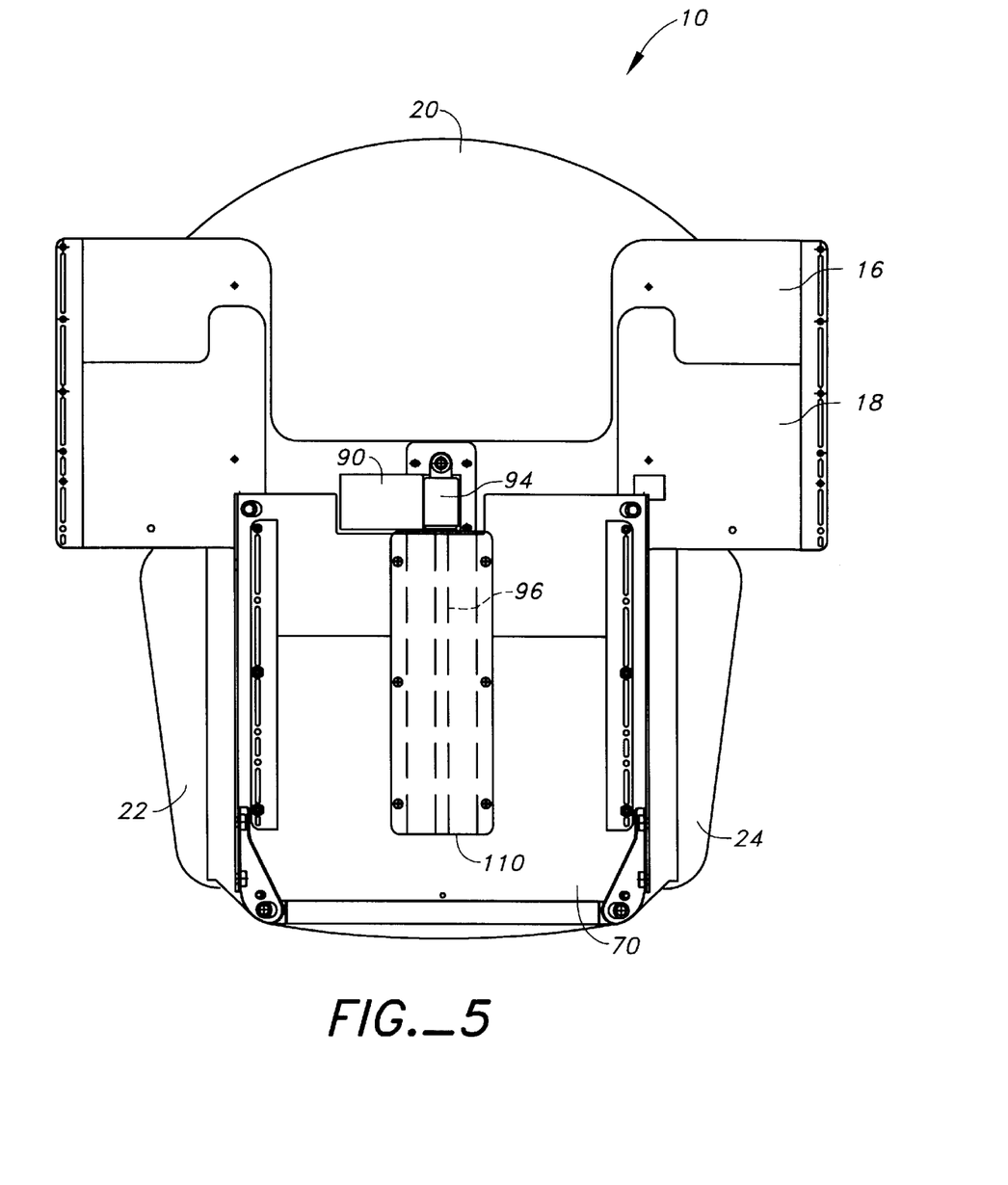
FIG. 5 is a front elevational view of an assembled retractable windshield and flare panel assembly in a retracted configuration with the windshield shown in a retracted configuration having the windshield retracted down and the flare panels retracted inward.

FIGS. 4 and 5 diagrammatically shows the relationship of the windshield 20 and the flare panels 22, 24 when the drive block 198 in positioned either all the way up of all the way down. The position of the hole 34 in the windshield 20 and the position of the sliders 102, 104 in the angled slots 74, 76 in the flare panels 22, 24 cause the windshield 20 to be positioned vertically and the flare panels 22, 24 to be positioned horizontally. FIG. 4 shows the retractable windshield and flare panel assembly 10 in an extended configuration where the windshield 20 is extended vertically upward and the flare panels 22, 24 are extended horizontally sideward. FIG. 5 shows the retractable windshield and flare panel assembly 10 in a retracted configuration where the windshield 20 is extended vertically downward and the flare panels 22, 24 are retracted horizontally sideward.

The windshield 14 is itself curved, or bowed, to provide improved resistance to wind-induced deformation and vibration of the windshield. For additional structural strength, the concentric front windshield support panel 16, the rear windshield support panel 22, and rear flare-panel support panel 70 are sandwiched together in a manner which forms a structural bridging arc similar to a monocoque structure which provides improved resistance to wind-induced deformation and vibration of the windshield. Note that the guide tracks are arranged so that curved movable windshield 20 moves up and down in its own track between the front and rear windshield panels 16 and 18. The inner parts of the left and right flare panels 22, 24 slide horizontally past each other as these panel are extended and retracted in their respective tracks.

Figure 6:
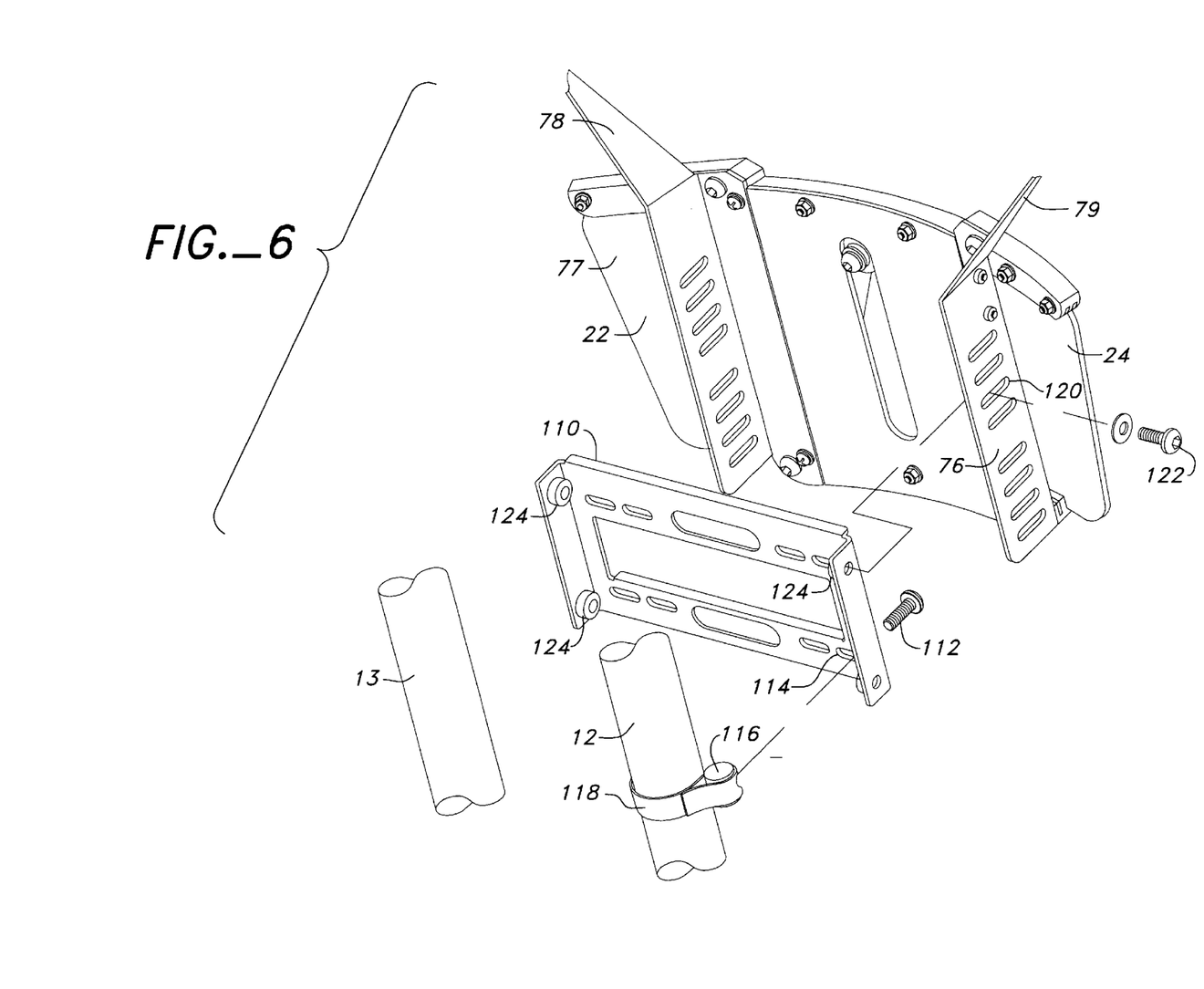
FIG. 6 is an exploded rear perspective view of a portion of a motorcycle fork, a universal mounting plate, and a rear flaring panel.

FIG. 6 shows a universal mounting plate 110 for attaching a retractable windshield and flare panel assembly 10 according to the invention to the front forks 12, 13 of a representative typical motorcycle with a universal mounting plate 110. The universal mounting plate 110 is fixed to the forks 12, 13 using a plurality of screws, typically shown as 112, which pass through elongated mounting slots, typically shown as 114, in the plate 110 and are threaded into threaded blocks, typically shown as 116, which are strapped to the forks with straps, typically shown as 118.

The stainless steel mounting angle brackets 76, 77 are provided with a plurality of elongated slots, typically shown as 120, through which pass screws, typically shown as 122 for threadable engaging pressed-in lock nuts, typically shown as 124, fixed to side flanges of the universal mounting plate 110. The position and orientation of the retractable windshield and flare panel assembly 10 on a motorcycle is adjusted with straps 118 and the screws 112, 122. A retractable windshield and flare panel assembly according to the invention attaches to the forks of a motorcycle and allows a headlight to be mounted to it.

Figure 7:
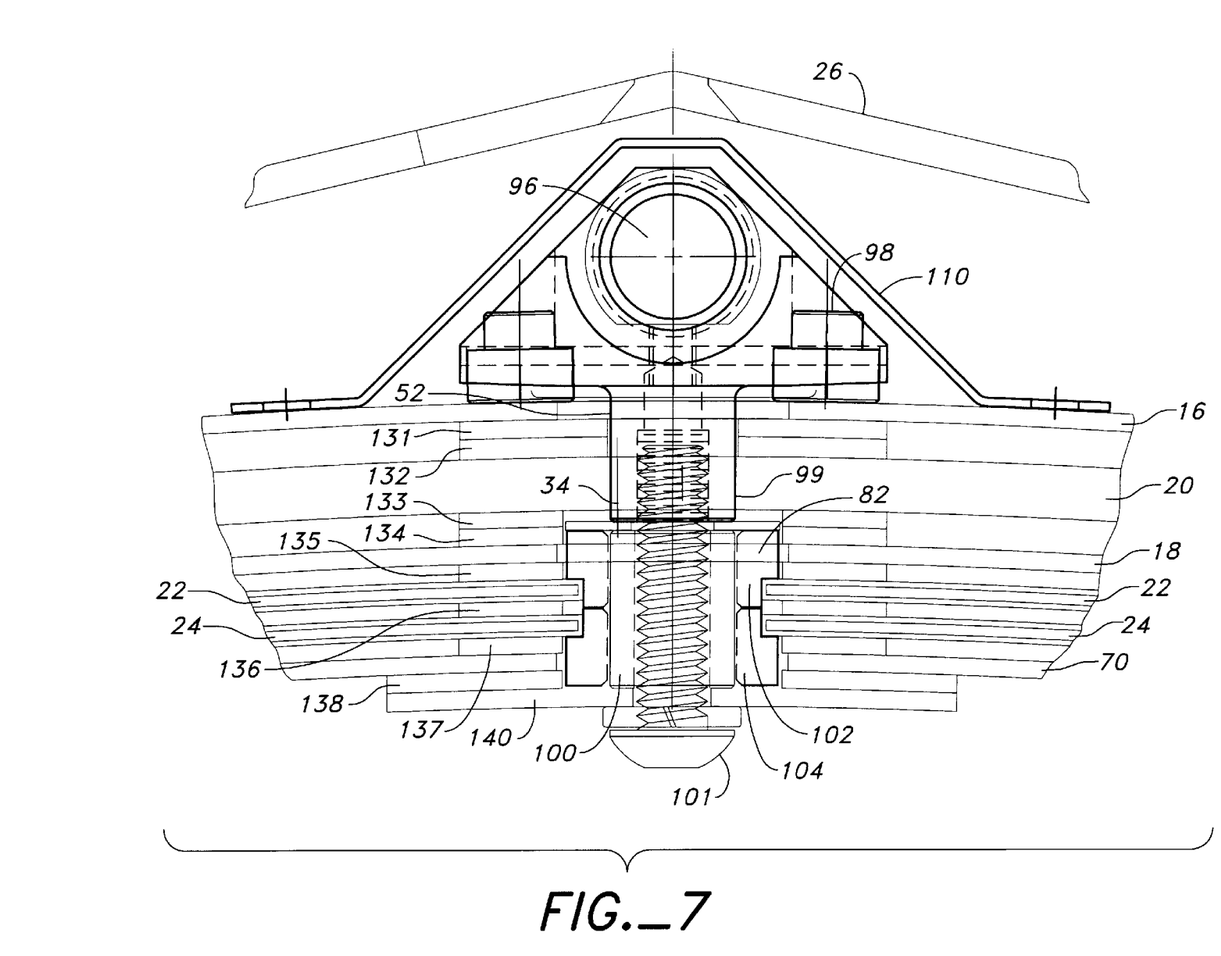
FIG. 7 is an enlarged sectional detail view of a portion of the retractable windshield and flare panel assembly illustrating connection of the windshield and flare panels to the drive screw for raising and lowering the windshield and for extending and retracting the flare panels.

FIG. 7 shows an enlarged portion of the retractable windshield and flare panel assembly showing connection of the windshield 20 and the flare panels 22, 24 to the drive screw 96. The internally threaded stud 99 is mounted to the drive block 98, which is operated by the externally threaded drive screw 96. The internally threaded stud 99 extends out from the drive block 98 and has the cylindrical post 100 fixed to it with a ¼-20 screw 101. The stud 99 extends backward from the drive block 98 through the slot 52 in the front windshield support panel 16. The stud 99 then engages the hole 34 formed in the lower portion of the windshield 20. The spacer 100 attached to the end of the stud 99 further extends through the slot 82 in the rear windshield support panel 18 and through the pair of flare panel sliders 102, 104. The flare panel sliders 102, 104 engage with the respective angled slots 74, 76 formed in the left and right flare panels 22, 24. As illustrated in the Figure, plastic spacer washers 131–138 provide for appropriate spacing between the various components connected to the stud 99 and the spacer 100. The cover 110 for the drive screw 96 and the headlight panel 26 are attached to the front windshield support panel 16. An aluminum end cap 140 is positioned beneath the head of the screw 101.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular us contemplated. It is intended that the scope of the invention be defined by the claims appended hereto and their equivalents.

I claim:

1. A windshield and flare panel module for a motorcycle, comprising:

a vertically moveable windshield having side edges;

windshield guides for engaging and guiding the side edges of the windshield as the windshield edges move vertically;

a pair of oppositely-moving, horizontally-retractable flare panels extending on respective side of said motorcycle, wherein each of said pair has top and bottom edges;

flare panel guides for engaging and guiding the top and bottom edges of each of the pair of horizontally retractable flare panels as the pair of horizontally retractable flare panels move horizontally; and a mechanism for simultaneously moving the windshield vertically and the flare panels horizontally.

2. The windshield and flare panel module of claim 1 wherein the mechanism for moving the windshield vertically and the flare panels horizontally includes:

a drive screw; and a threaded drive block which engages and moves with the drive screw wherein the drive block is coupled to the windshield flare panels coupled to the horizontally-retractable flare panels.

3. The windshield module of claim 1 wherein the mechanism for moving the windshield vertically and the flare panels horizontally includes:

elongated cam slots formed in the movable left and right flare panels at an angle with the horizontal;

a pair of flare panel sliders coupled to the drive block, each of said panel sliders engaging one of the elongated slots formed in a respective one of the pair of left and right flare panels; and means for turning the drive screw to move the threaded drive block vertically and thereby horizontally position the pair of flare panel sliders.

4. The windshield and flare panel module of claim 1 wherein the means for engaging and guiding the side edges of the windshield as the windshield edges move vertically includes windshield tracks for engaging and guiding the side edges of the windshield as the windshield edges slide vertically in the windshield tracks.

5. The windshield and flare panel module of claim 1 wherein the means for engaging and guiding the top and bottom edges of each of the pair of horizontally retractable flare panels as the pair of horizontally retractable flare panels move horizontally includes a pair of flare panel tracks for engaging and guiding the top and bottom edges of the horizontally retractable flare panels as the horizontally retractable flare panels move horizontally.

6. The windshield and flare panel module of claim 1 wherein the windshield is curved and wherein the windshield module includes means for reinforcing the curved windshield to provide resistance to wind-induced deformation and vibration of the windshield.

7. The windshield and flare panel module of claim 6 wherein the windshield guides are positioned between a first windshield support panel and a second windshield support panel;

wherein the flare panel guides are positioned between the one of the windshield support panels and a flare support panel;

wherein the windshield support panels and the flare support panel are curved to provide a curved support structure for the curved windshield.

8. The windshield and flare panel module of claim 7 including vertically extending angle brackets fixed to the flare support panel to provide additional rigidity to the windshield and flare panel module.

9. A windshield and flare module for a motorcycle, comprising:

a vertically moveable windshield having side edges;

windshield guides having tracks provided between the rear windshield support panel and a flare panel support panel, said flare panel tracks engaging and guiding the side edges of the windshield as the windshield edges slide vertically in the windshield tracks;

a pair of oppositely-moving, horizontally-retractable flare panels each of said pair having top and bottom edges;

flare panel guides having tracks provided between the rear windshield support panel and a flare panel support panel, said flare panel tracks engaging and guiding the top and bottom edges of the horizontally retractable flare panels as the horizontally retractable flare panels move horizontally as the pair of horizontally retractable flare panels move horizontally; and a mechanism for moving the windshield vertically up and down and for moving the flare modules horizontally, the mechanism including:

a screw;

a windshield retainer for engaging a hole formed in the windshield;

elongated slots formed in the movable left and right flare panels and a pair of flare panel sliders, each of the sliders engaging a respective one of the slots formed in a respective left and right flare panels, wherein said elongated slot extends in both vertical and horizontal directions;

a threaded drive block which engages the screw and which is coupled to the windshield retainer and to the flare panel sliders; and means for turning the screw to move the threaded drive block to vertically position the windshield and simultaneously horizontally position the flare panel sliders on each side of the windshield module.

10. The windshield and flare module of claim 9:

wherein the windshield guides are positioned between a first windshield support panel and a second windshield support panel;

wherein the flare panel guides are positioned between the one of the windshield support panels and a flare support panel; and wherein the windshield support panels and the flare support panel are curved to provide a curved support structure for the curved windshield.

11. The windshield and flare module of claim 10 including vertically extending angle brackets fixed to the flare support panel to provide additional rigidity to the windshield and flare panel module.

12. The flare module of claim 11 wherein the means for turning the screw to move the threaded drive block and vertically position the windshield and horizontally position the flare panel sliders on each side of the windshield module includes a reversible motor.

13. A flaring module assembly for a motorcycle:
- a vertically moveable curved windshield which has side edges;
- front and a rear windshield support panels fixed together around the windshield;
- windshield guides fixed between the front and rear windshield support panels and having tracks formed therein for engaging and guiding the side edges of the windshield as the windshield edges slide vertically in the tracks;
- a flare support panel;
- a movable left flare panel having parallel top and bottom edges;
- left flare panel guides fixed between the rear windshield panel and the rear panel and having for engaging and guiding the edges of the left flare panel as the left flare panel slides horizontally in the left flare panel tracks;
- a movable right flare panel having parallel top and bottom edges;
- right flare panel guides fixed between the rear windshield panel and the flare support panel and having tracks for engaging and guiding the edges of the right flare panel as the right flare panel slides horizontally in the tracks;
- vertically extending angle brackets fixed to the flare support panel to provide additional rigidity to the windshield and flare panel module;
- a mechanism for moving the windshield vertically up and down and for moving the left and right flare modules horizontally, the mechanism including:
  - a screw;
  - a windshield retainer for engaging a hole formed in the windshield;
  - elongated slots formed in the movable left and right flare panels and a pair of flare panel sliders, each of the sliders engaging a respective one of the slots formed in a respective left and right flare panels;
  - a threaded drive block which engages the screw and which is coupled to the windshield retainer and to the flare panel sliders;
  - means for turning the screw to move the threaded drive block and vertically position the windshield and horizontally position the flare panel sliders on each side of the windshield module; and
  - a motor for turning the screw to vertically position the windshield in its tracks and to position the windshield and the left and right flare panel in their respective tracks; and
- wherein the curved movable windshield, left and right flaring panels, all of the tracks, the fixed front windshield panel, the fixed rear windshield panel, the fixed flaring rear panel are arranged to slide past each other.

* * * * *